US010399615B2

(12) United States Patent
Williams et al.

(10) Patent No.: US 10,399,615 B2
(45) Date of Patent: Sep. 3, 2019

(54) TAILGATE-MOUNTED AIR DRAG REDUCTION MECHANISM

(71) Applicant: Toyota Motor Engineering & Manufacturing North America, Inc., Erlanger, KY (US)

(72) Inventors: Paxton S. Williams, Milan, MI (US); Scott L. Frederick, Brighton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 4 days.

(21) Appl. No.: 15/631,271

(22) Filed: Jun. 23, 2017

(65) Prior Publication Data

US 2018/0370581 A1 Dec. 27, 2018

(51) Int. Cl.

| | |
|---|---|
| ***B62D 35/00*** | (2006.01) |
| ***B60J 7/00*** | (2006.01) |
| ***B62D 33/03*** | (2006.01) |
| ***B62D 33/027*** | (2006.01) |
| ***F15D 1/12*** | (2006.01) |
| ***B62D 37/02*** | (2006.01) |

(52) U.S. Cl.
CPC ........... *B62D 35/007* (2013.01); *B62D 37/02* (2013.01); *F15D 1/12* (2013.01)

(58) Field of Classification Search
USPC ........................................................... 701/49
See application file for complete search history.

(56) References Cited

U.S. PATENT DOCUMENTS

| | | | | |
|---|---|---|---|---|
| 5,069,498 A * | 12/1991 | Benchoff | B62D 35/001 | 296/180.1 |
| 5,352,008 A * | 10/1994 | Denvir | B62D 33/0273 | 296/180.1 |
| 5,468,037 A * | 11/1995 | Peterson | B62D 33/0273 | 296/57.1 |
| 5,735,567 A * | 4/1998 | Mora, Sr. | B62D 35/007 | 296/180.1 |
| 5,743,589 A * | 4/1998 | Felker | B62D 33/0273 | 296/180.5 |
| 6,991,277 B1 * | 1/2006 | Esler | B60P 1/435 | 296/26.08 |
| 7,874,610 B2 | 1/2011 | Khalighi | | |

(Continued)

*Primary Examiner* — Adam D Tissot
(74) *Attorney, Agent, or Firm* — Christopher G. Darrow; Darrow Mustafa PC

(57) ABSTRACT

An air drag reduction mechanism for a vehicle is provided. The mechanism includes a base and an air deflector rotatably coupled to the base. The air deflector is rotatable between a stowed configuration and a deployed configuration. At least one actuator is operatively coupled to the air deflector and structured to rotate the air deflector between the stowed configuration and the deployed configuration. At least one latching mechanism is operatively coupled to the air deflector and the base. The latching mechanism is structured to engage when the air deflector rotates from the stowed configuration to the deployed configuration, to maintain the air deflector in the deployed configuration. The latching mechanism is also structured to disengage when the air deflector reconfigures from the extended configuration to the retracted configuration so as to permit rotation of the air deflector from the deployed configuration to the stowed configuration.

10 Claims, 13 Drawing Sheets

(56) References Cited

U.S. PATENT DOCUMENTS

| | | | | |
|---|---|---|---|---|
| 8,727,424 | B1 * | 5/2014 | Nelson | B62D 35/001 296/180.1 |
| 9,108,685 | B1 * | 8/2015 | Froling | B60P 7/02 |
| 2008/0030049 | A1 | 2/2008 | Cooper | |
| 2008/0315623 | A1 * | 12/2008 | Khaligh | B62D 33/0273 296/180.5 |
| 2017/0101138 | A1 * | 4/2017 | Povinelli | B60J 7/141 |

* cited by examiner

TAILGATE-MOUNTED AIR DRAG REDUCTION MECHANISM

TECHNICAL FIELD

The embodiments described herein relate to air drag reduction mechanisms for vehicles.

BACKGROUND

During movement of a pickup truck along a road, ambient airstreams may flow relatively smoothly over the truck cab. However, when the airstream flows down into the cargo bed portion of the truck, it may impinge on the raised tailgate, exerting drag forces on the tailgate that may increase with the square of the speed of the vehicle relative to the airstream in which it is traveling. The need to overcome such drag forces may greatly increase fuel consumption, especially at higher vehicle speeds. Accordingly, it is desirable to reduce the drag forces produced by an airstream flowing into the tailgate of a pickup truck.

SUMMARY

In one aspect of the embodiments described herein, an air drag reduction mechanism for a vehicle is provided. The mechanism includes a base and an air deflector rotatably coupled to the base. The air deflector is rotatable between a stowed configuration and a deployed configuration. At least one actuator is operatively coupled to the air deflector and structured to rotate the air deflector between the stowed configuration and the deployed configuration. At least one latching mechanism is operatively coupled to the air deflector and the base. The at least one latching mechanism is structured to engage when the air deflector rotates from the stowed configuration to the deployed configuration, to maintain the air deflector in the deployed configuration. The at least one latching mechanism is also structured to disengage when the air deflector reconfigures from the extended configuration to the retracted configuration so as to permit rotation of the air deflector from the deployed configuration to the stowed configuration.

In another aspect of the embodiments described herein, a computing system for a vehicle is provided. The computing system includes one or more processors for controlling operation of the computing system, and a memory for storing data and program instructions usable by the one or more processors. The one or more processors are configured to execute instructions stored in the memory to: determine a value of an air drag reduction mechanism actuation criterion; determine whether the value of the air drag reduction mechanism actuation criterion is within a predetermined range; and, responsive to a determination of whether the value of the drag reduction mechanism actuation criterion is within the predetermined range, control operation of a tailgate-mounted the drag reduction mechanism of the vehicle so that an air deflector of the drag reduction mechanism is configured to one of a deployed configuration and a stowed configuration.

In another aspect of the embodiments described herein, a vehicle is provided including an air drag reduction mechanism having an air deflector structured to be configurable to a retracted configuration and an extended configuration. A computing system is operatively coupled to the air drag reduction mechanism. The computing system includes one or more processors for controlling operation of the computing system, and a memory for storing data and program instructions usable by the one or more processors. At least one sensor is operatively coupled to the air drag reduction mechanism and to the computing system. The at least one sensor is configured to detect an object in a path of movement of a portion of the air deflector during configuration of the air deflector to the extended configuration. The one or more processors are configured to execute instructions stored in the memory to, responsive to detection of an object in the path of movement of the portion of the air deflector, stop further motion of the portion of the air deflector in the direction of the object.

DETAILED DESCRIPTION

Embodiments described herein are directed to an air drag reduction mechanism for a vehicle. The mechanism may include a base and an air deflector rotatably coupled to the base. The base may be formed by a tailgate adapted to mount the components of the air drag reduction mechanism. The air deflector may be rotatable between a stowed configuration and a deployed configuration. In the stowed configuration, the air deflector may rest flush against a surface of the tailgate facing the cargo bed. The air deflector may be automatically rotated to the deployed configuration by one or more actuators. In the deployed configuration, the air deflector may be raised to extend parallel with the floor of the cargo bed. In the deployed configuration, the air deflector may also extend over the rear portion of the cargo bed, to cover the rear portion of the bed. A portion of the air deflector may also be extended farther forward when the air deflector is in the deployed configuration. The deployed length of the air deflector is thus adjustable to deflect an airstream entering the cargo bed, for a wide range of cargo bed lengths.

FIGS. 1-8 show various views of an embodiment of a vehicle air drag reduction mechanism, generally designated 20. The air drag reduction mechanism 20 may be incorporated into a vehicle and may be configured to be manually or automatically deployable to aid in reducing air drag resulting from movement of the vehicle. In the embodiment shown, the air drag reduction mechanism 20 is incorporated into a pickup truck 12, although an embodiment of the air drag reduction mechanism may be incorporated into or operatively attached to another type of vehicle.

Figure 1A:
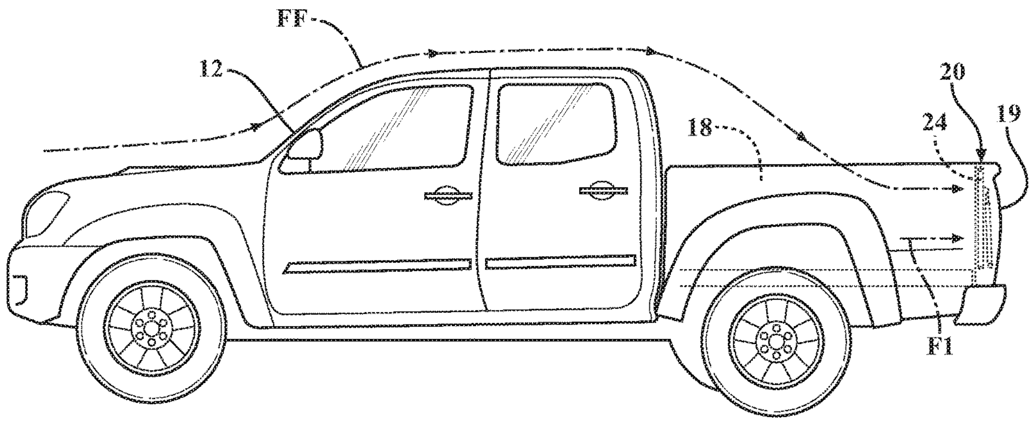
FIG. 1A is a schematic side view of a moving pickup truck showing an air drag reduction mechanism 20 in accordance with an embodiment described herein including an air deflector 24 in a stowed configuration.

FIG. 1A is a schematic side view of a moving pickup truck 12 showing an air drag reduction mechanism 20 in accordance with an embodiment described herein including an air deflector 24 in a stowed configuration. The air drag reduction mechanism 20 is incorporated into a tailgate 19 of the truck. A moving airstream FF may flow over a top of the truck and down into the cargo bed 18. The airstream FF may then impinge upon the raised tailgate 19, exerting a force F1 on the tailgate. Unless interrupted or prevented, this airstream FF may greatly increase the air drag experienced by the pickup truck.

Figure 1B:
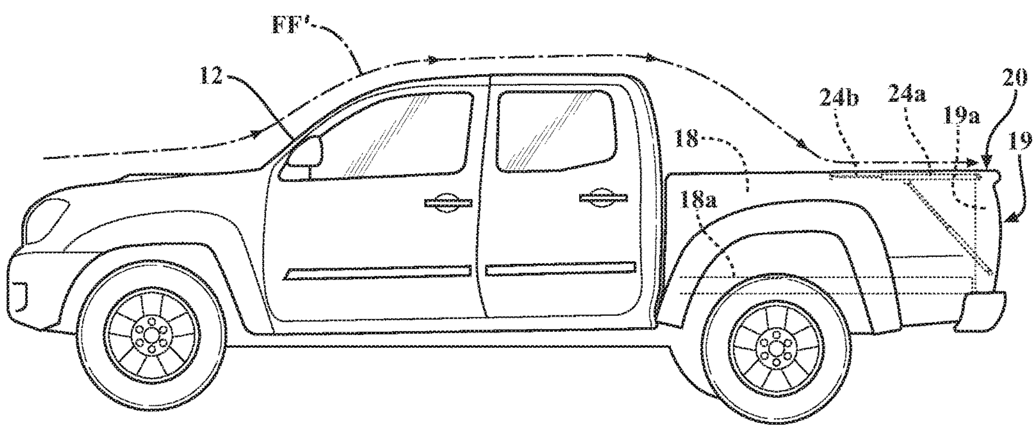
FIG. 1B is the schematic side view of FIG. 1A showing the air drag reduction mechanism 20 with the air deflector 24 in a deployed configuration.

FIG. 1B is the schematic side view of FIG. 1A showing the air drag reduction mechanism 20 with the air deflector 24 in a deployed configuration. With the air deflector 24 in this configuration, the air drag reduction mechanism 20 deflects and modifies the airflow to produce a revised airstream path FF' flowing over a top of the truck, down onto the deployed air deflector 24 and toward the rear of the vehicle 12. In this manner, the air drag reduction mechanism 20 reduces the drag on the rear portion of the vehicle.

The air drag reduction mechanism 20 may be mounted onto (or incorporated into the structure of) a tailgate 19 of the pickup truck 12. For example, FIGS. 2-8 show an embodiment of the air drag reduction mechanism incorporated into the structure of the tailgate. FIG. 9 shows a modular embodiment 120 of the air drag reduction mechanism attachable to the tailgate 19, for example, as a retrofit.

In one or more arrangements, and as shown in FIGS. 2-8, air drag reduction mechanism 20 may include a base and an air deflector 24 rotatably coupled to the base. The base may be formed by a shell 19*a* of the tailgate. The shell 19*a* may have a cavity 19*b* formed therein for receiving elements of the air drag reduction mechanism 20 so that the air deflector 24 may rest flush against an outer surface 19*c* of the tailgate or recessed within the cavity 19*b* when the air deflector is in the stowed configuration. The base 19*a* may include a hard shoulder 22*s* structured to limit rotation of the air deflector first portion 24*a* (described below) during deployment of the air deflector 24. Alternatively, as seen in FIG. 9, a base 122 may be formed by a part separate from the tailgate 19 and structured to be attachable to the tailgate 19 along an outer surface 19*c* of the tailgate or received within a cavity 19*b* formed in the tailgate 19, with the air deflector 24 facing toward the cargo bed.

Referring to FIGS. 2-8, air deflector 24 may have a first portion 24*a* rotatably coupled to the base 19*a*, and a second portion 24*b* received within the deflector first portion 24*a* so as to be retractably extendable from the first portion 24*a*. Air deflector first portion 24*a* may have a base portion 24*s*, a first sidewall 24*c* extending from a first edge of the base portion, and a second sidewall 24*d* extending from a second edge of the base portion opposite the first edge. A first shoulder 24*f* may extend from the air deflector first portion first sidewall 24*c* in the general direction of the air deflector first portion second sidewall 24*d*, and a second shoulder 24*g* may extend from the air deflector first portion second sidewall 24*d* in a direction toward the air deflector first portion first sidewall 24*c*. In combination, the base portion 24*s*, first sidewall 24*c*, and first shoulder 24*f* may form a first channel or cavity 24*r* structured for slidingly receiving therein an associated first side edge 24*b*-1 of the air deflector second portion 24*b*. Also, in combination, the base portion 24*s*, second sidewall 24*d*, and second shoulder 24*g* may form a second channel or cavity 24*u* structured for slidingly receiving therein an associated second side edge 24*b*-2 of the air deflector second portion 24*b* which resides opposite the first side edge 24*b*-1.

Air deflector second portion 24*b* may slide along channels 24*r* and 24*u* during reconfiguration of the air deflector between a retracted configuration and an extended configuration, as described herein. Air deflector second portion 24*b* may have a forward edge 24*b-f* structured to define a forward-most surface of the air deflector second portion 24*b* when the air deflector 24 is in the extended configuration. Stated another way, the air deflector second portion forward edge 24*b-f* is a portion of the air deflector 24 which extends farthest forward in a direction toward the front of the vehicle when the air deflector 24 is in the extended configuration.

The air deflector 24 may be rotatable between a stowed configuration (shown in FIGS. 1A, 2, and 6) and a deployed configuration (shown in FIGS. 1B, 3-5, 7, and 8). The air deflector 24 may be mounted so as to be deployable into or toward a cargo bed of the pickup truck, as shown in FIGS. 1B, 3-5, 7, and 8. For purposes of deflecting an airstream flowing into the cargo bed as shown in FIG. 1B, the air deflector first portion 24*a* and the air deflector second portion 24*b* may be dimensioned with respect to a width of the cargo bed so as to occupy or extend across as much of the width of the cargo bed as possible, to aid in preventing air from flowing between the air deflector and the cargo bed sidewalls. Referring to FIG. 1B, in one or more arrangements, the air deflector first portion 24*a* may also be structured to be deployable to extend parallel with a floor 18*a* of the cargo bed when the air deflector 24 is in the extended configuration.

Figure 2:
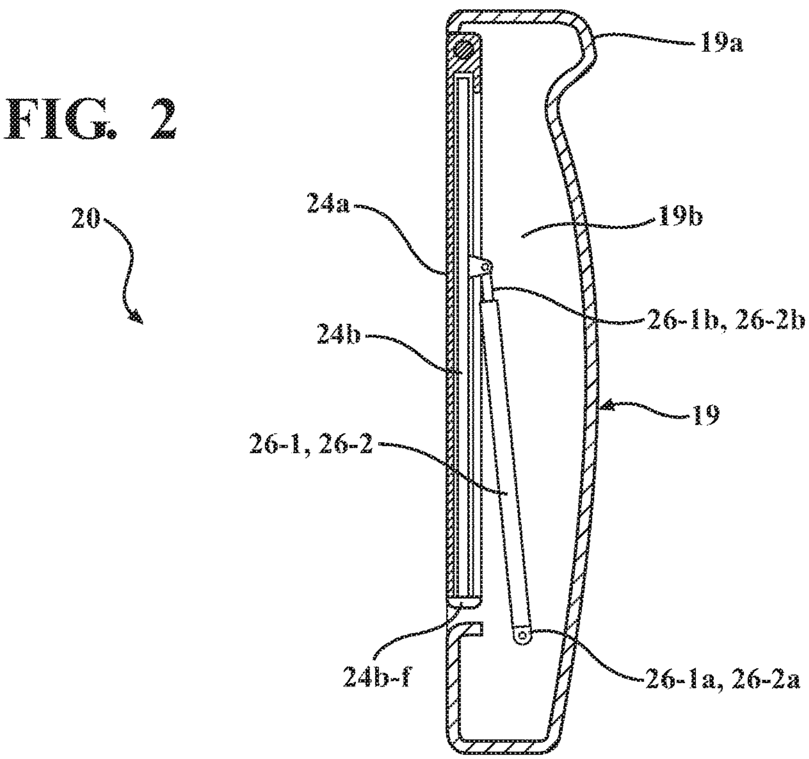
FIG. 2 is a schematic cross-sectional side view of an air drag reduction mechanism incorporated into a vehicle tailgate, and including an air deflector shown in a stowed configuration.
Figure 6:
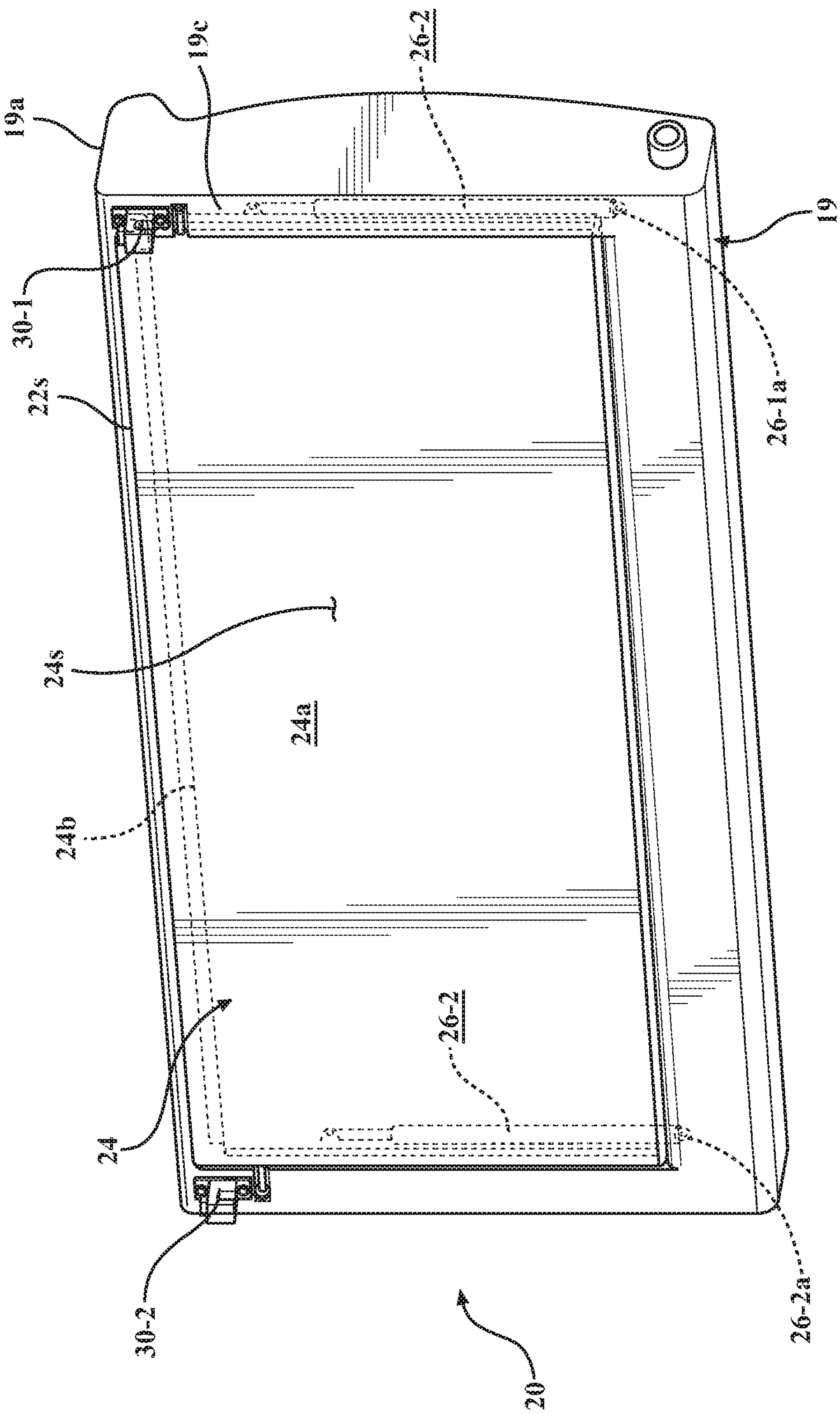
FIG. 6 is a schematic perspective view of the air drag reduction mechanism shown in FIGS. 2-5, and showing the air deflector shown in the stowed configuration.

The stowed configuration may be a configuration as shown in FIGS. 1A, 2, and 6, in which the air deflector 24 is in a nondeployed or rest position where the air deflector 24 rests within or against the base 19*a*. In the stowed condition, the air deflector 24 may be positioned in the cavity 19*b* formed in the base 19*a* or may be resting against the base. The deployed configuration may be a configuration in which the air deflector 24 is raised or deployed at least to some degree (i.e., a configuration other than the stowed configuration). A fully deployed configuration of the air deflector 24 may be a configuration as shown in FIG. 1B, where the air deflector first portion is raised to the horizontal or as far as it is permitted to be raised within the tailgate cavity 19*b*.

Figure 4:
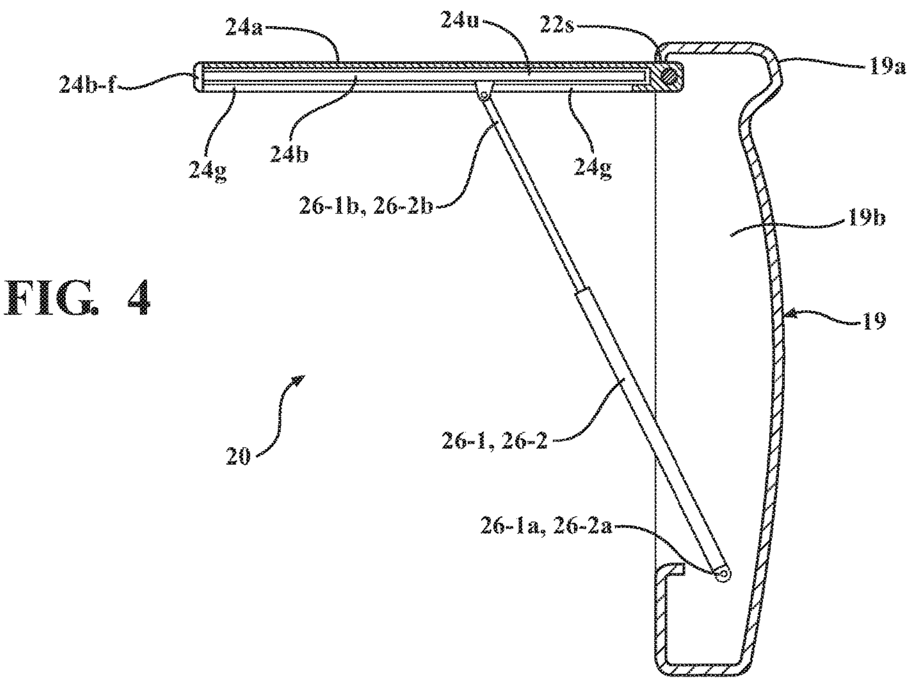
FIG. 4 is the schematic cross-sectional side view of FIG. 2, showing the air deflector shown in a fully-deployed and retracted configuration.
Figure 5:
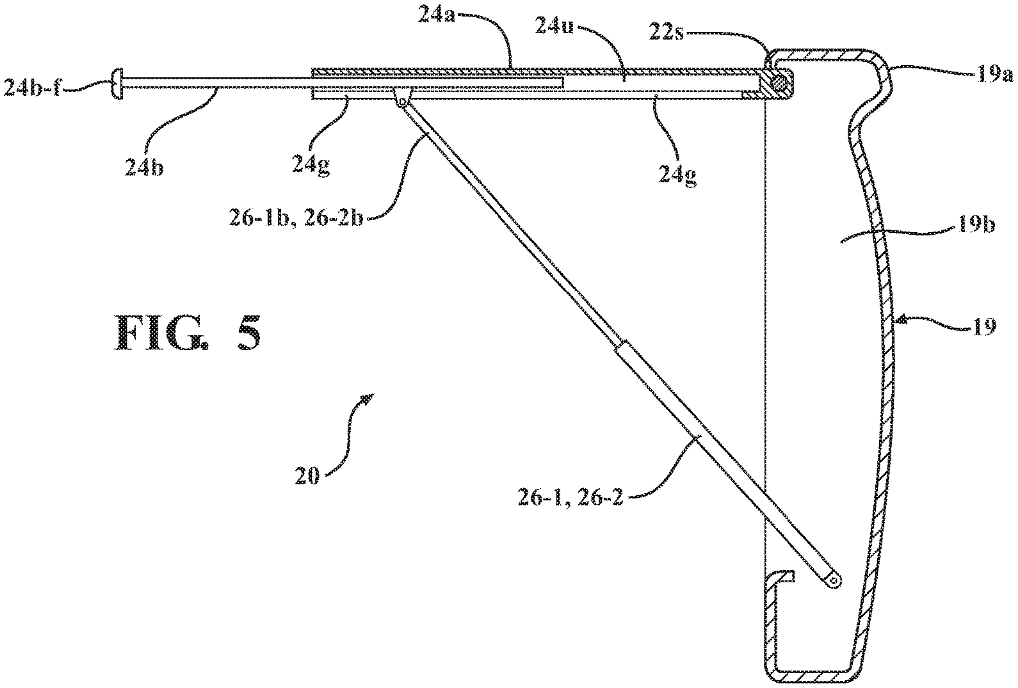
FIG. 5 is the schematic cross-sectional side view of FIG. 2, showing the air deflector shown in an extended configuration.
Figure 7:
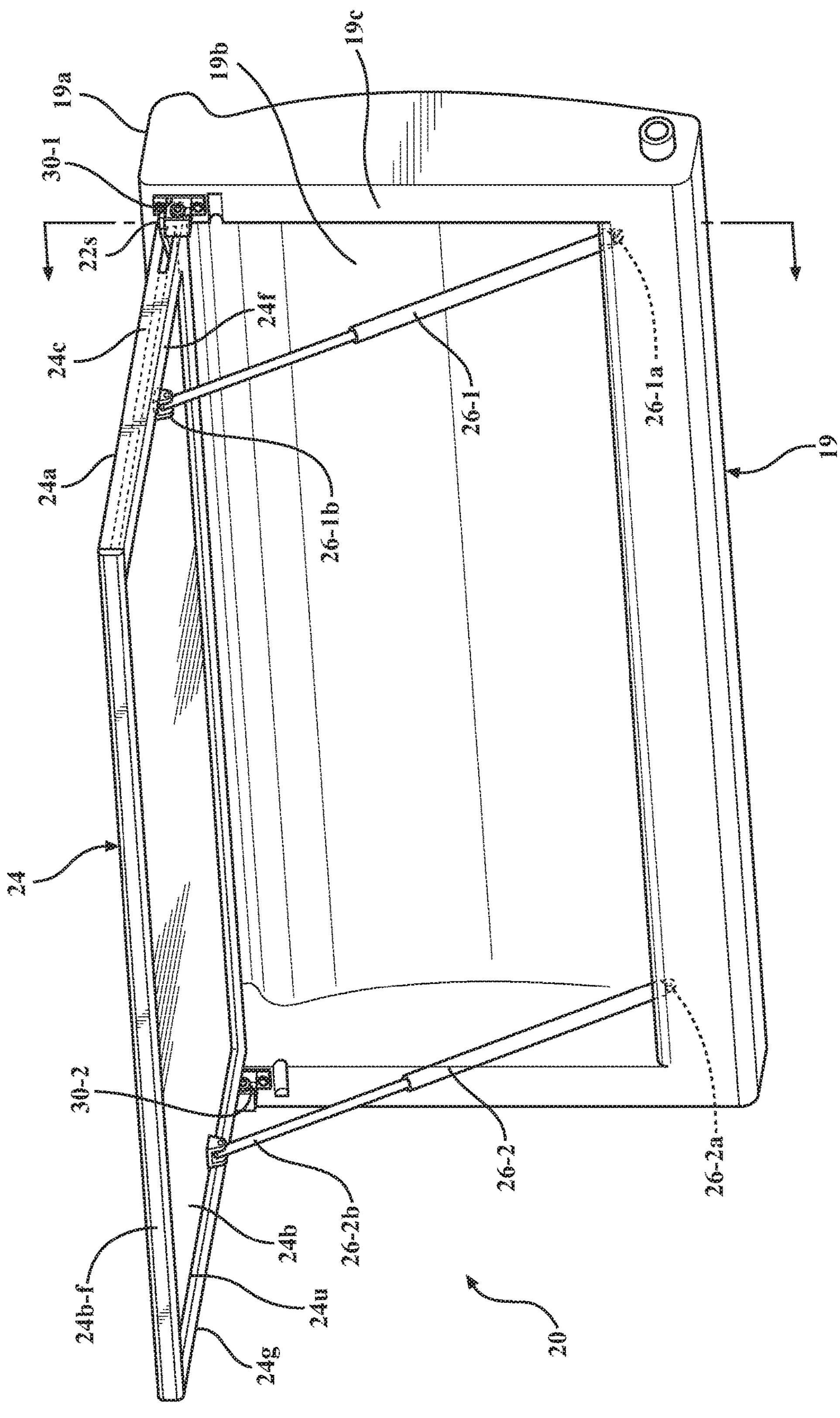
FIG. 7 is the schematic perspective view of FIG. 6, showing the air deflector shown in a fully-deployed and retracted configuration.
Figure 8:
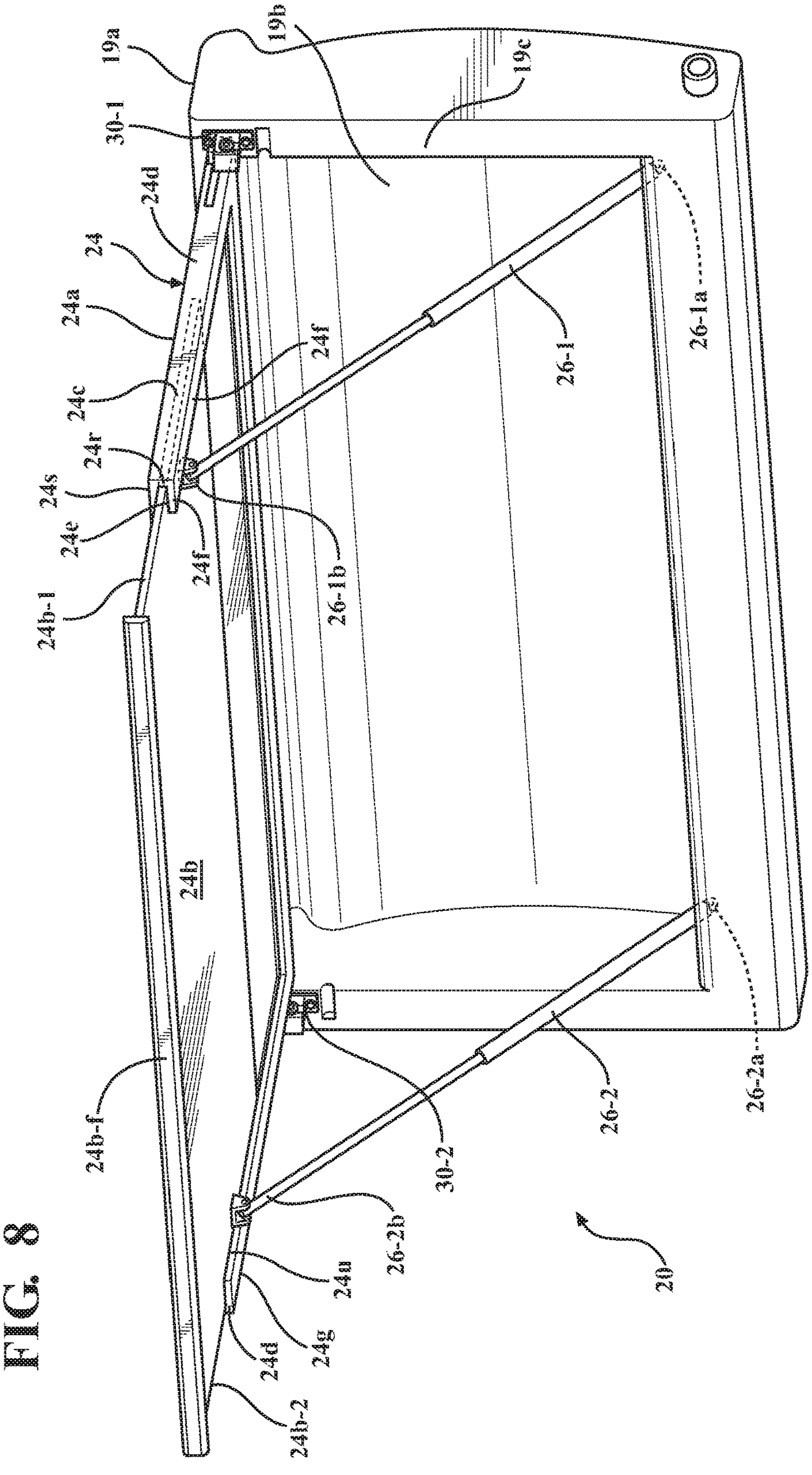
FIG. 8 is the schematic perspective view of FIG. 6, showing the air deflector in a fully-deployed and extended configuration.
Figure 9:
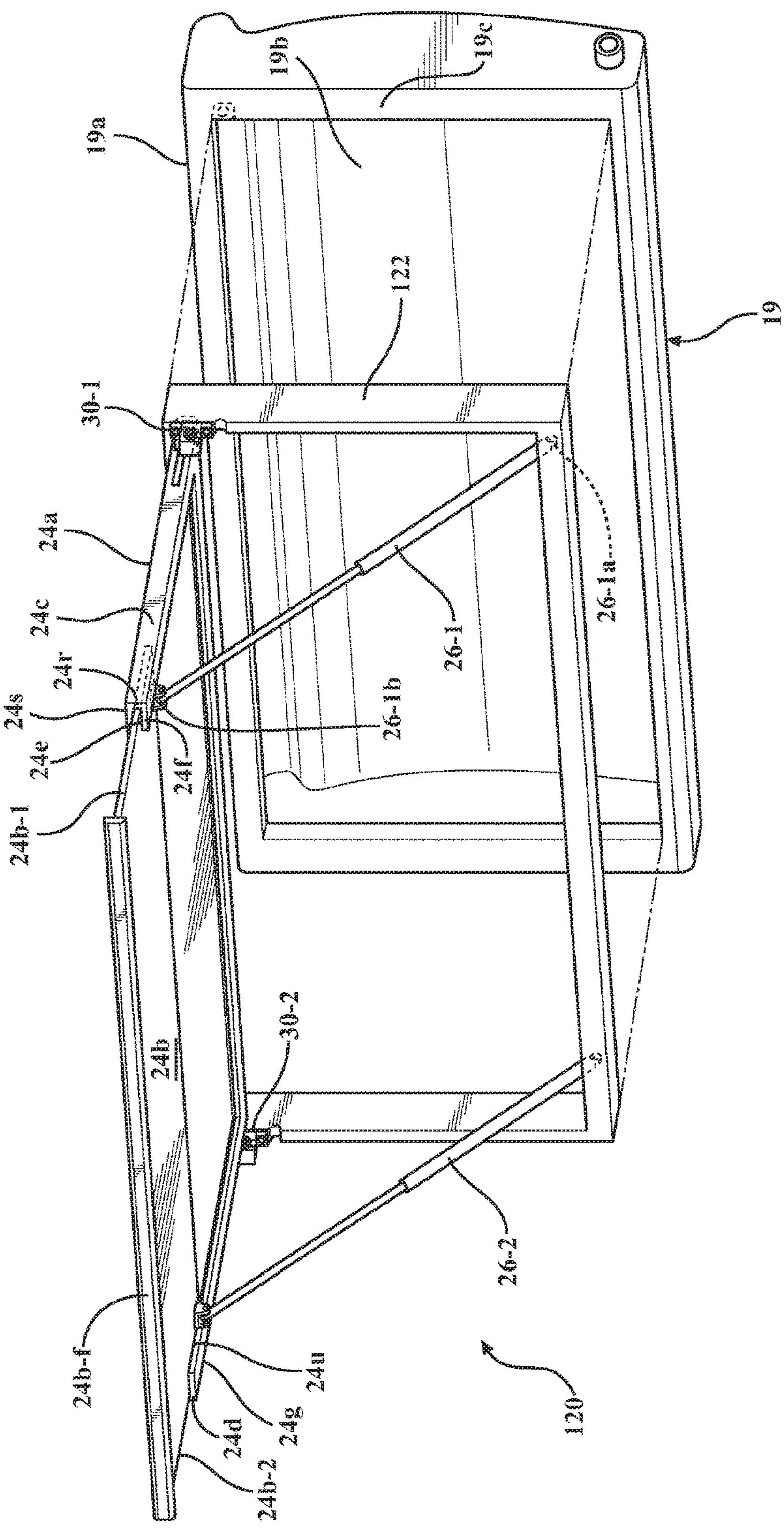
FIG. 9 is a schematic perspective view of an air drag reduction mechanism in accordance with another embodiment described herein, incorporated into a vehicle tailgate and including an air deflector shown in a fully-deployed and extended configuration.

In addition, the air deflector 24 may be structured such that, when the air deflector 24 is in the deployed configuration, the air deflector may be configurable in one of a retracted configuration (shown in FIGS. 3, 4, and 7) and an extended configuration (shown in FIGS. 1B, 5, and 8). The retracted configuration may be a configuration or relative position of the air deflector 24 in which the air deflector second portion 24*b* actuates one or more latching mechanisms 30 as described herein so as to disengage the latching mechanism(s), thereby enabling rotation of the air deflector 24 from the deployed configuration to the stowed configuration. The air deflector 24 may be structured to be configurable to the retracted configuration by retracting the air deflector second portion 24*b* into the air deflector first portion 24*a* so as to actuate the latching mechanism(s) 30, such that the latching mechanism(s) 30 become disengaged to enable rotation of the air deflector 24 from the deployed configuration to the stowed configuration.

The extended configuration of the air deflector 24 may be a configuration in which the air deflector second portion 24*b* has moved out of the retracted configuration and extends from the air deflector first portion 24*a* at least far enough to permit the latching mechanism(s) 30 to engage the air deflector first portion 24*a*, to maintain the air deflector 24 in the deployed configuration. The air deflector 24 may be structured to be configurable to the extended configuration by extending the air deflector second portion 24*b* from the air deflector first portion 24*a*.

At least one actuator 26 may be coupled to the air deflector 24. The at least one actuator 26 may be structured to rotate the air deflector 24 between the stowed configuration and the deployed configuration. In the embodiment shown, a pair of actuators 26-1 and 26-2 in the form of actuatable power cylinders is provided to rotate the air deflector 24. Actuator cylinders 26-1 and 26-2 may be conventional pneumatic or hydraulic cylinders, for example. However, other types of actuators may also be used. In the embodiment shown, first ends 26-1*a* and 26-2*a* of respective cylinders 26-1 and 26-2 may be rotatably connected to base 19*a*, and second ends 26-1*b* and 26-2*b* of respective cylinders 26-1 and 26-2 may be rotatably connected to the air deflector 24, so as to permit free rotation of the cylinders with respect to the air deflector and the base. In one or more arrangements, the actuators 26-1 and 26-2 are operatively coupled to the air deflector second portion 24*b* so as to enable the actuators to extend the air deflector second portion 24*b* from the air deflector first portion 24*a*, and so as to enable the actuators 26-1 and 26-2 to retract the air deflector second portion 24*b* into the air deflector first portion 24*a*.

At least one latching mechanism 30 may be provided and structured to engage to maintain the air deflector 24 in the deployed configuration, when the air deflector 24 rotates from the stowed configuration to the deployed configuration. The at least one latching mechanism 30 may also being structured to disengage so as to permit rotation of the air deflector 24 from the deployed configuration to the stowed configuration, when the air deflector 24 reconfigures from the extended configuration to the retracted configuration. In the embodiment shown, components of a first latching mechanism 30-1 may be positioned adjacent where the air deflector first portion first sidewall 24*c* enters the base 19*a*. Also, components of a second latching mechanism 30-2 may be positioned adjacent where the air deflector first portion second sidewall 24*d* enters the base 19*a*.

The air deflector second portion 24*b* may be structured to disengage the latching mechanism(s) 30-1 and 30-2 during retraction of the air deflector second portion 24*b* into the air deflector first portion 24*a*. In one or more arrangements, the insertion depth of the air deflector second portion 24*b* into the air deflector first portion 24*a* may be specified such that the latching mechanism(s) 30-1 and 30-2 may disengage when the air deflector second portion 24*b* is inserted as far as possible into the air deflector first portion 24*a*. This enables the latching mechanism(s) to be in "engagement-ready" configurations whenever the air deflector second portion 24*b* is not inserted as far as possible into the air deflector first portion 24*a*. Thus, the latching mechanism(s) 30-1 and 30-2 may engage when the air deflector first portion 24*a* reaches the deployed configuration, even if the air deflector second portion 24*b* is only slightly extended out from the air deflector first portion 24*a*.

FIGS. 10A-10H show details of one embodiment of a latching mechanism 30-1 usable for the purposes described herein. Any of a variety of alternative latching mechanisms may be used, provided they function as described herein. Although a latching mechanism 30-1 positioned long one side of the tailgate 19 will be described, it will be understood that a similar latching mechanism 30-2 may also positioned along an opposite side of the tailgate. Latching mechanism 30-2 may also operate in the manner described below for latching mechanism 30-1.

Figure 10:
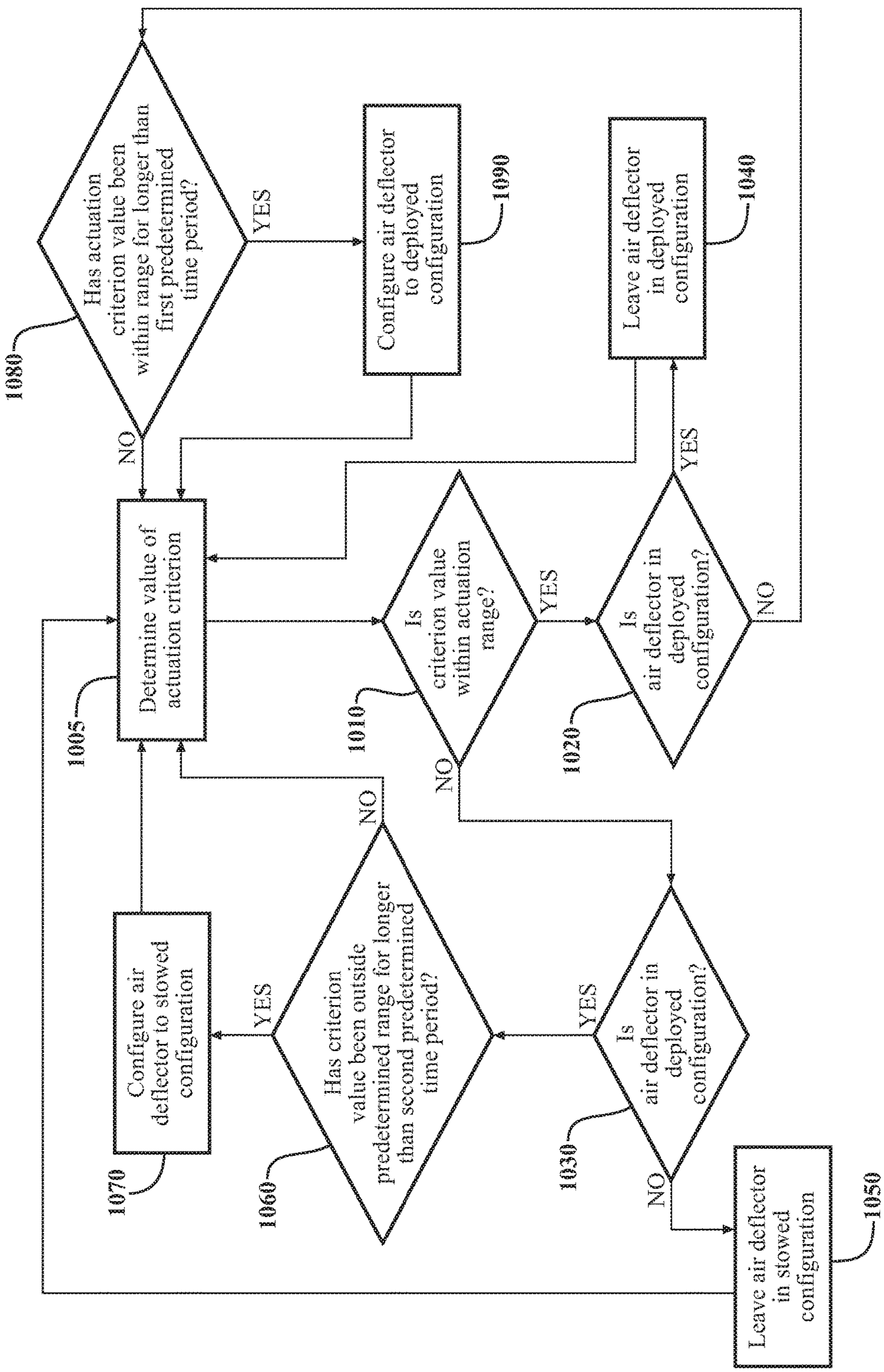
FIG. 10 is a block diagram showing one embodiment of an actuation mode of an air drag reduction mechanism in accordance with an embodiment described herein.
Figure 10A:
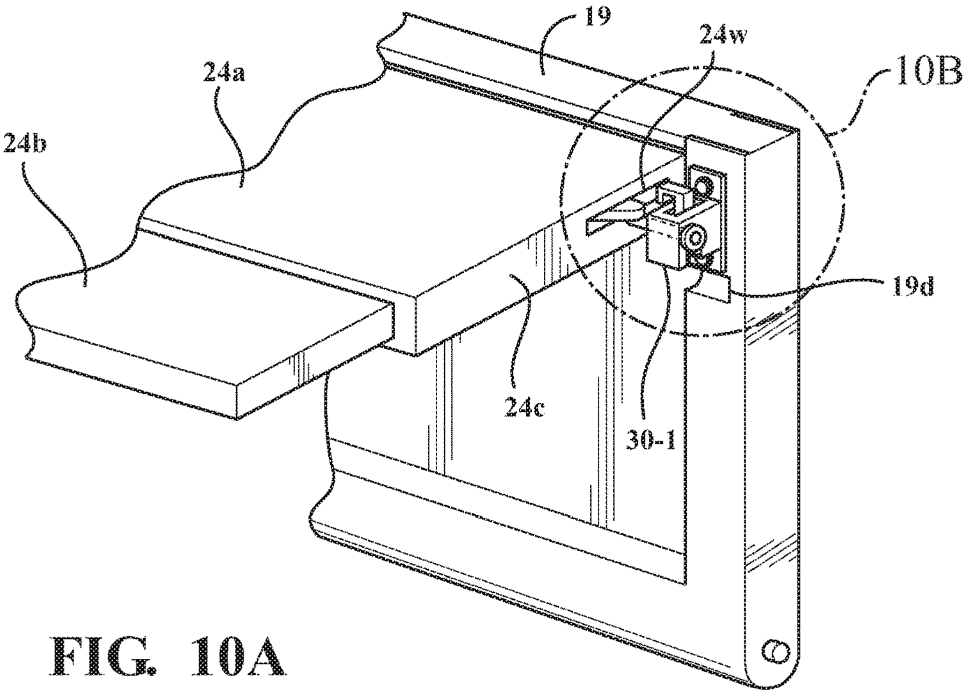
FIGS. 10A-10H are various views showing the structure and operation of a latching mechanism in accordance with an embodiment described herein.

Referring to FIGS. 10A-10H, FIG. 10A is a schematic perspective view of a portion of the tailgate 19 with air deflector second portion 24*b* in an extended configuration. In the extended configuration of the air deflector as shown in FIGS. 5 and 10A, the latching mechanism 30-1 is structured to maintain the air deflector 24 in the deployed configuration.

Figure 10B:
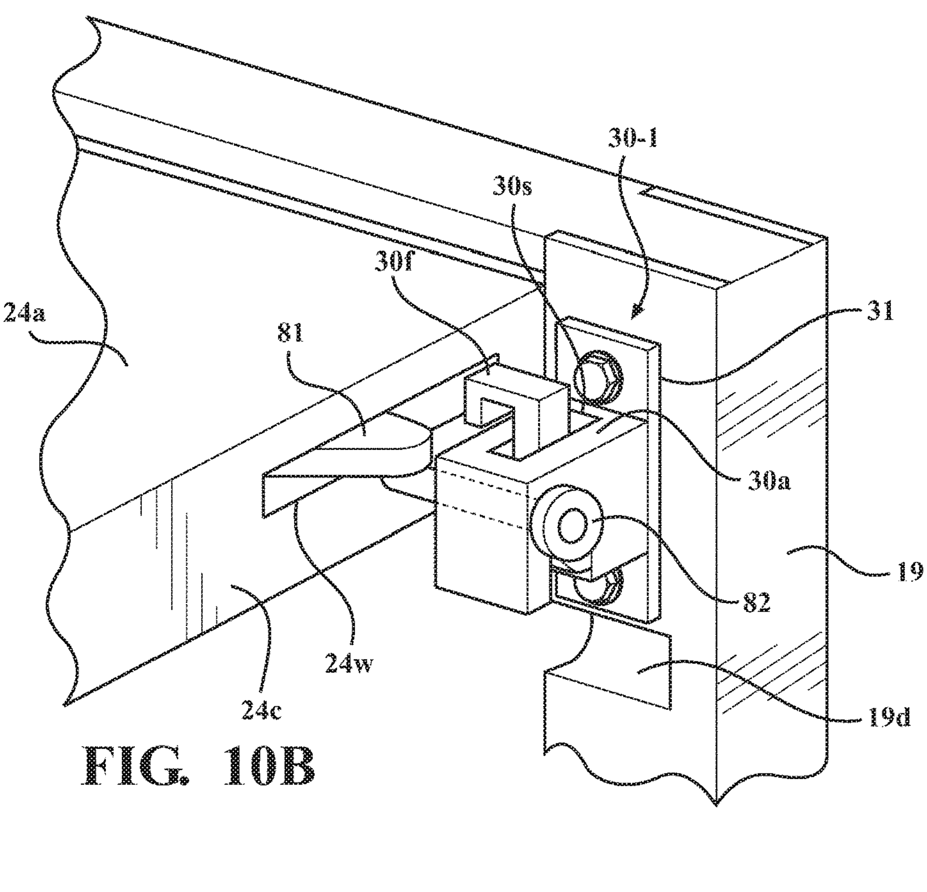

FIG. 10B is schematic view of a portion of the tailgate shown in FIG. 10A located proximate the latching mechanism 30-1. In the embodiment shown, the latching mechanism 30-1 may include a latching member 82 projecting from the air deflector first portion 24*a*, a latch 31 mounted to the tailgate shell 19*a* adjacent the cavity 19*b*, and a latch actuator 81 mounted on the air deflector second portion 24*b*.

In one arrangement, latching member 82 may be a pin or rod projecting from the air deflector first portion first sidewall 24*c*. The latching member 82 may be structured and secured to the air deflector first portion 24*a* so as to enable the latching member to support the air deflector 24 when the air deflector 24 is in a fully deployed configuration as shown in FIG. 1B and when the latching member 82 is engaged with the latch 31. The latching member 82 and latch 31 may be structured and connected to the remainder of the tailgate 19 so as to support the air deflector first portion 24*a* when the air deflector 24 is in the fully deployed configuration, against all forces expected to act on the air deflector 24 when it is in the fully deployed configuration. For example, forces due to the weights of the air deflector first and second portions 24*a* and 24*b*, forces caused by airflow around and onto the air deflector, forces exerted by power cylinders 26-1 and 26-2 during retraction of the air deflector second portion 24*b* into air deflector first portion 24*a* and other forces may act on the latch 31 and latching member 82 at various times. The latching member 82 may be formed from any suitable material, for example a metallic material. For embodiments in which the air deflector 24 is recessed within the tailgate 19, a notch 19*d* may be formed in base 19*a* adjacent cavity 19*b* to receive the latching member 82 therein when the air deflector is in the stowed configuration.

Figure 10C:
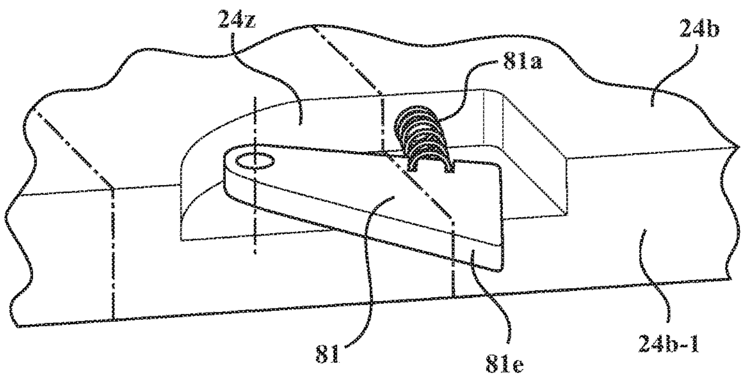

FIG. 10C is a schematic perspective view of a part of air deflector second portion 24*b* located along the first side edge 24*b*-1 of the air deflector second portion. In this embodiment, the air deflector second portion 24*b* may have a cavity 24*z* formed into the air deflector second portion side edge 24*b*-1. Latch actuator 81 may be rotatably mounted within cavity 24*z* using a pin or other mechanism, so as to enable a portion of the actuator to swing into the cavity 24*z* and out of the cavity. A spring member 81*a* may be operatively coupled to the actuator to bias the portion of the actuator toward the position outside the cavity 24*z*, as seen in FIG. 10C. When the latch actuator 81 extends outside the cavity, the latch actuator 81 extends past the air deflector second portion side edge 24*b*-1 (FIG. 8). Also, an outer edge 81*e* of the latch actuator 81 may be shaped so as to provide a lead-in surface for engaging an edge of the actuator first portion slot 24*w* (described below) when the air deflector second portion 24*b* moves in direction X2, toward its extended configuration. This engagement acts to rotate the latch actuator 81 against the spring force into cavity 24*z*. In this arrangement, the latch actuator 81 slides along air deflector first portion sidewall 24*c* during movement of the air deflector second portion 24*b* into and out of air deflector first portion 24*a*.

Figure 10D:
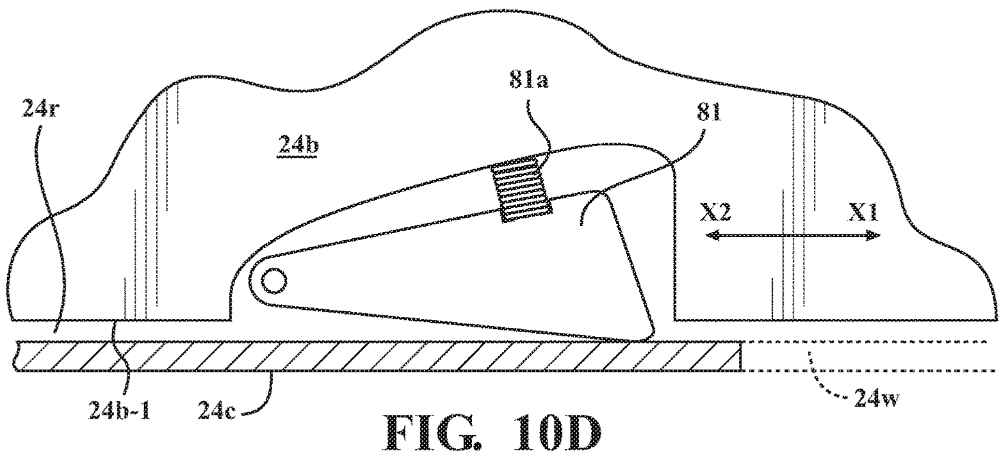

FIG. 10D is a schematic plan view of a portion of an interior of the air deflector first portion 24*a* showing the part of the air deflector second portion side edge 24*b*-1 containing the cavity 24*z* positioned within the air deflector first portion channel 24*r*. The air deflector first portion 24*a* also includes a slot 24*w* extending along the air deflector first portion first sidewall 24*c*. Slot 24*w* extends through the air deflector first portion first sidewall 24*c* between an exterior of the sidewall 24*d* and an interior of air deflector first portion channel 24*r*. Slot 24*w* is structured and positioned to permit latch actuator 81 to rotate into and out of the slot during motion of the air deflector second portion 24*b*, in a manner described below.

Latch 31 may include a housing 30*a* and an engagement member 30*b* slidably positioned within the housing 30*a*. Housing 30*a* may be bolted or otherwise secured to tailgate base 19*a*. Housing may have an opening 30*s* formed in a surface of the housing structured to face in an upward direction when the housing is mounted to the tailgate base 19*a*. The opening 30*s* may be structured to allow an actuator engagement portion 30*f* of the engagement member 30*b* (described below) to extend from the housing 30*a* for engaging latch actuator 81, and may also be sized to permit the actuator engagement portion 30*f* to slide in directions X1 and X2 during operation of the latch. A side of the housing 30*a* into which opening 30*s* is formed may be open so as to permit insertion of the engagement member 30*b* into the housing 30*a* and insertion of the engagement portion 30*f* into the opening 30*s*.

Figure 10E:
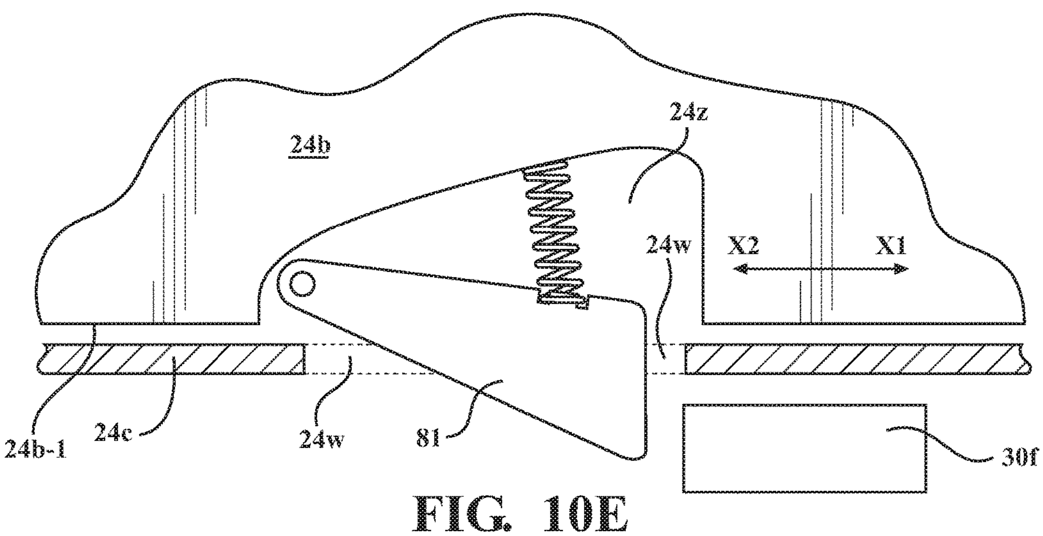
Figure 10F:
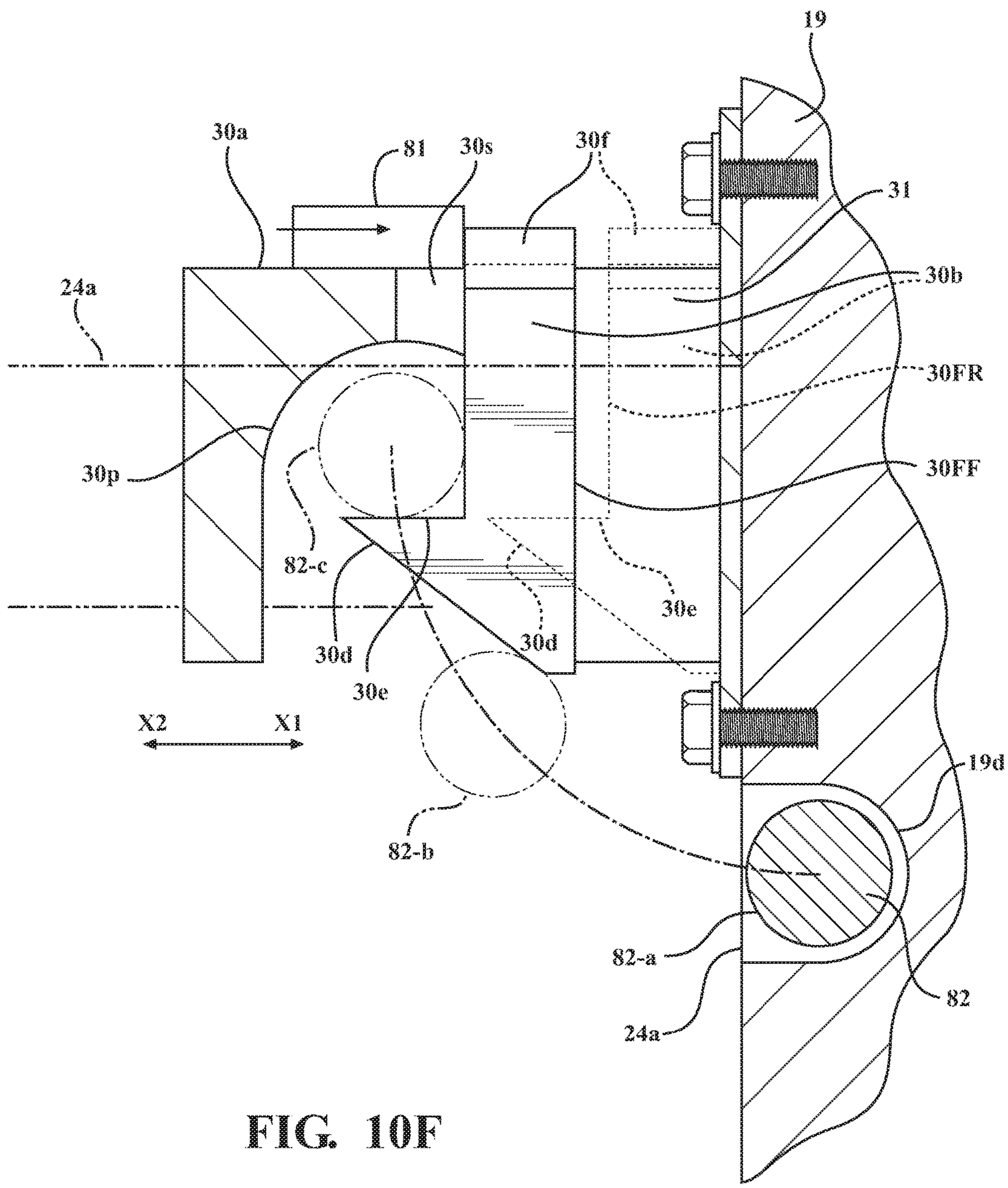
Figure 10G:
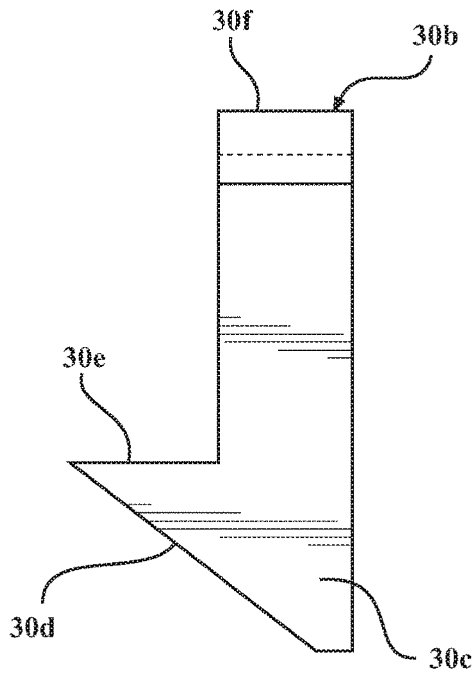
Figure 10H:
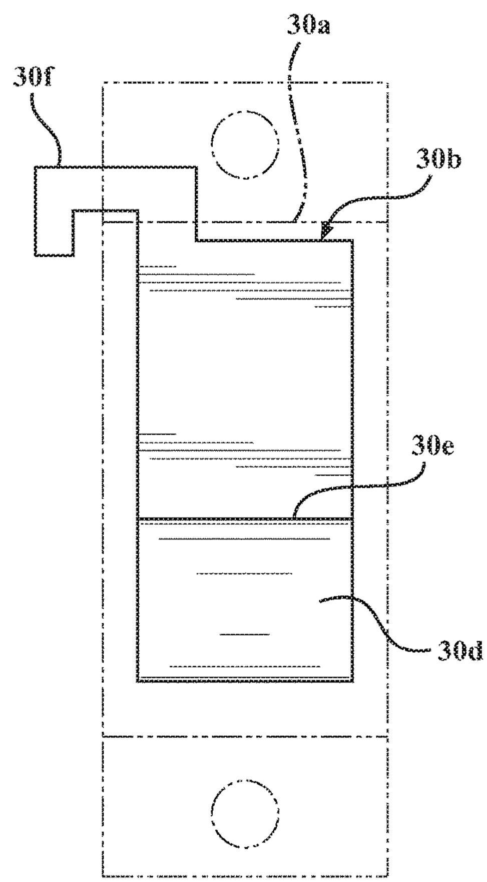

Referring to FIGS. 10F-10H, engagement member 30*b* may include a ramp surface 30*d*, a retaining surface 30*e*, and an actuator engagement portion 30*f*. Engagement member 30*b* may be movable within housing 30*a* in a first direction X1 and in a second direction X2 opposite the first direction. Direction X1 may be a direction toward the rear of the vehicle, while direction X2 may be a direction toward the front of the vehicle. The engagement member 30*b* may also be movable between a rear-most position 30FR position of maximum retraction within the housing 30*a*, and a forward-most position 30FF within the housing 30*a*. Engagement member 30*b* may be spring-loaded within housing 30*a* so as to bias the engagement member 30*b* toward or into the forward-most position 30FF.

Ramp surface 30*d* may be structured and positioned so as to be engageable by the latching member 82 as shown in FIG. 10F (in position 82-*b*) when the air deflector first portion 24*a* raises from the stowed orientation of the air deflector 24 (with the latching member 82 in position 82-*a*) to the fully deployed orientation (with the latching member 82 in position 82-*c*). Retaining surface 30*e* may support the latching member 82 so as to retain the air deflector 24 in the deployed configuration when the latching mechanism 30-1 is engaged. Actuator engagement portion 30*f* may extend from the opening 30*s* for engaging the latch actuator 81 to release or disengage the latching mechanism 30-1 as described herein.

Operation of the latching mechanism will now be described with reference to FIGS. 10A-10H.

Referring to FIG. 10F, prior to raising of the air deflector 24 from the stowed configuration to the deployed configuration, the latching mechanism is disengaged, and the engagement member 30*b* is spring-biased to the forward-most position 30FF. As air deflector 24 is raised from the stowed configuration to the deployed configuration, latching member 82 leaves position 82-*a* in notch 19*d* and rotates into housing opening 30*p*, engaging engagement member ramp surface 30*d*. As the latching member 82 continues to rise, it slides along the ramp surface 30*d*, forcing the engagement member 30*b* to move in direction X1 within housing 30*a* until continued rotation of the latching member 82 positions the latching member 82 above the retaining surface 30*e* (in position 82-*c*). At this point, the air deflector 24 resides in a horizontal orientation and spring-loaded engagement member 30*b* snaps back in direction X2, positioning the retaining surface 30*e* in a supporting position under the latching member 82. The air deflector first portion 24*a* is now supported by the latching member 82 resting on the retaining surface 30*e*.

As further rotation of air deflector first portion 24*a* is prevented by shoulder 22*s*, further operation of cylinders 26-1 and 26-2 moves the air deflector second portion 24*b* in direction X2, thereby forcing the air deflector 24 to extend from its retracted configuration to the extended configuration. During movement of the air deflector second portion 24*b* in and out of the air deflector first portion 24*a*, the latch actuator 81 slides along air deflector first portion sidewall 24*c* as shown in FIG. 10D.

During operation of the cylinders 26-1 and 26-2 to retract the air deflector second portion 24*b* back into the air deflector first portion 24*a*, the latch actuator 81 slides along air deflector first portion sidewall 24*c* toward slot 24*w*. In FIG. 10D, the air deflector second portion 24*b* is still in a partially extended configuration. FIG. 10D shows the latch actuator 81 pressed into cavity 24*z* by abutment with air deflector first portion first sidewall 24*c*, against the extension force exerted by spring member 81*a*.

FIG. 10D is a portion of an interior of the air deflector first portion 24*a* showing the part of the air deflector second portion side edge 24*b*-1 containing the cavity 24*z* positioned within the air deflector first portion channel 24*r*. FIG. 10E is the schematic plan view of FIG. 10D showing actuator 81 extending through slot 24*w* during movement of the air deflector second portion 24*b* in direction X1, and prior to the actuator 81 engaging the actuator engagement portion 30*f* of the engagement member 30*b*. FIG. 10F is a schematic side view of a portion of the tailgate 19 including latch 31, showing rotation of the air deflector first portion 24*a* and its attached latching member 82 from a stowed configuration to a fully deployed configuration. FIG. 10F also shows movement of the engagement member 30*b* between the rear-most position 30FR within the housing 30*a*, and a forward-most position 30FF within the housing 30*a*. FIG. 10G is a schematic side view of a latch engagement member 30*b* in accordance with an embodiment described herein. FIG. 10H is a schematic front view of the latch engagement member 30*b* of FIG. 10G, showing the latch positioned in a housing attached to the tailgate base 19a adjacent the cavity 19b containing the air deflector 24.

Referring to FIGS. 10D and 10E, as the air deflector second portion 24b is retracted in direction X1 back into air deflector first portion 24a, the latch actuator 81 reaches slot 24w. When the actuator reaches the slot 24w, at a location prior to the actuator 81 reaching the actuator engagement portion 30f, the spring member 81a is able to rotate the latch actuator 81 so that it extends outside the cavity 24z and past the air deflector second portion side edge 24b-1. Referring to FIGS. 10E and 10F, further motion of the latch actuator 81 in direction X1 causes the latch actuator 81 to engage the actuator engagement portion 30f, thereby forcing the actuator engagement portion 30f in direction X1. This forces engagement member 30b in direction X1 until the engagement member 30b reaches maximum retraction position 30FR. At this point, retaining surface 30e no longer supports latching member 82. Thus, air deflector first portion 24a is allowed to rotate back into the stowed configuration within the tailgate base 19a.

Figure 11:
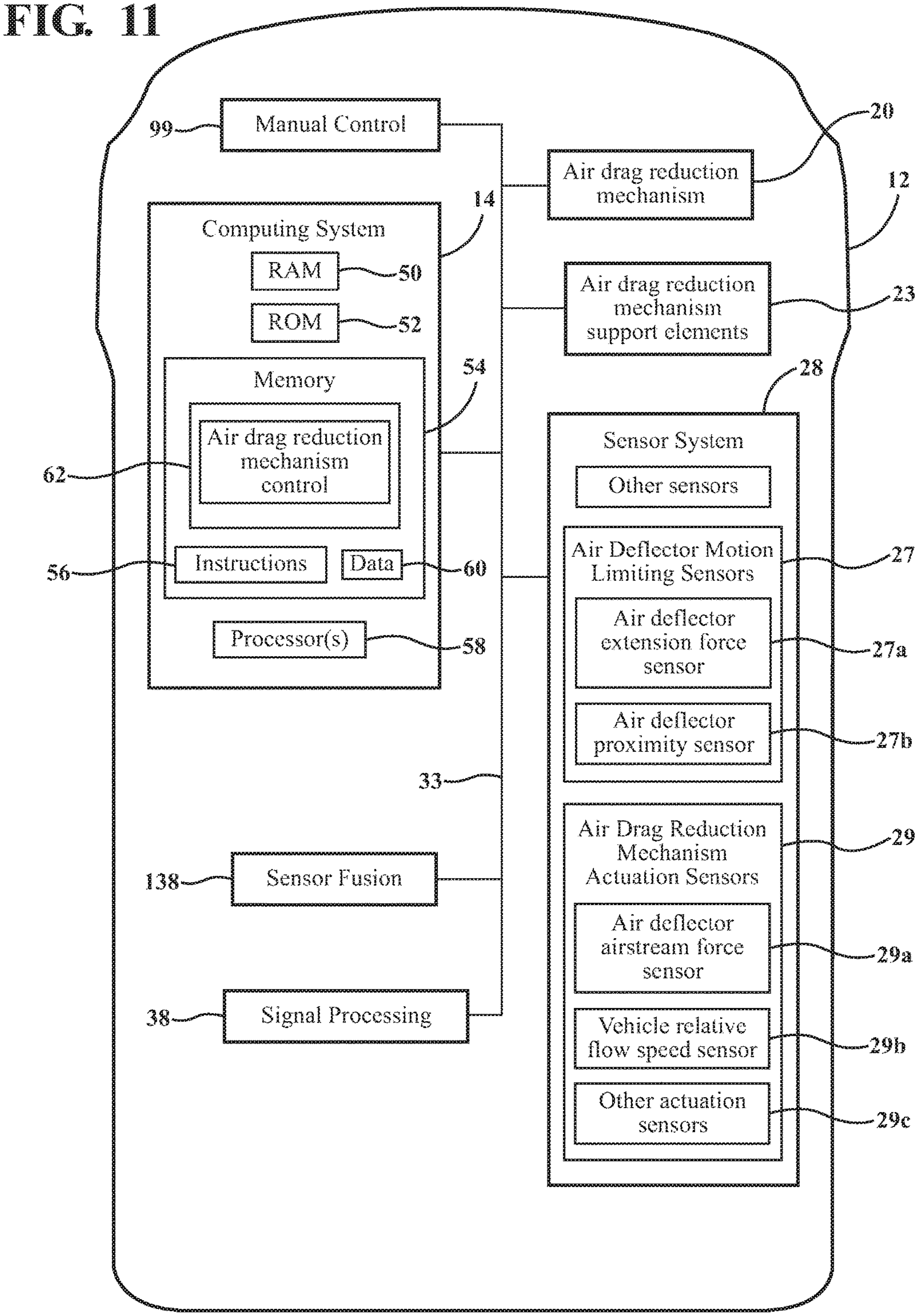
FIG. 11 is a functional block diagram illustrating a vehicle incorporating an air drag reduction mechanism in accordance with an embodiment described herein.

FIG. 11 is a functional block diagram illustrating a vehicle 12 incorporating an air drag reduction mechanism 20 in accordance with an embodiment described herein. As stated previously, the vehicle 12 may be in the form of a pickup truck. However, the vehicle may alternatively be any vehicle which has an open cargo bed or other space into which an air stream may flow during motion of the vehicle, thereby increasing air drag on the vehicle. The air drag reduction mechanism may be configured to operate in an autonomous mode (i.e., without input from a vehicle occupant). In one or more arrangements, a user may specify parameters or condition in which the air drag reduction mechanism will operate. Alternatively or in addition to being operable in an autonomous mode, the air drag reduction mechanism may be operated manually by user actuation of a manual control 99 positioned in the vehicle occupant compartment, for example.

The vehicle 12 may include various systems, subsystems and components in operative communication with each other, such as a sensor system or array 28, a computing system 14, air drag reduction mechanism 20, air drag reduction mechanism support elements 23, and other systems and components needed for operating the vehicle as described herein. The vehicle 12 may also include other systems (not shown). The vehicle 12 may include more or fewer systems and each system could include multiple elements. Further, each of the systems and elements of vehicle 12 could be interconnected. Thus, one or more of the described functions of the vehicle 12 may be divided up into additional functional or physical components or combined into fewer functional or physical components.

Air drag reduction mechanism support elements 23 may collectively include all computer-controllable hydraulic or pneumatic pumps (or other air drag reduction mechanism actuator power sources), reservoirs, valves, fluid lines connecting fluid sources to cylinders, and/or any other infrastructure needed to support operation of the air drag reduction mechanism as described herein. One or more of the air drag reduction mechanism support elements 23 may be elements already installed in the vehicle 12 or elements that would be present in the vehicle even if the air drag reduction mechanism were absent. Alternatively, one or more of the air drag reduction mechanism support elements 23 may be elements that are installed in the vehicle specifically to support operation of the air drag reduction mechanism 20.

In a known manner, the vehicle sensors system 28 provides data used by the computing system 14 in formulating and executing suitable control commands for the various vehicle systems. Vehicle sensors 28 may include any sensors required to support operation of the air drag reduction mechanism as described herein. The sensor system 28 can include any suitable type of sensor. Various examples of different types of sensors will be described herein. However, it will be understood that the embodiments are not limited to the particular sensors described. In arrangements in which the sensor system 28 includes a plurality of sensors, the sensors can work independently from each other. Alternatively, two or more of the sensors can work in combination with each other. Sensors of the sensor system 28 can be operatively connected to the computing system 14 and/or any other element of the vehicle 12.

The sensor system 28 may include a number of air drag reduction mechanism actuation sensors 29 configured to sense information which may be usable by the computing system 14 in determining or estimating vehicle air drag and/or other parameters which may prompt actuation of the air drag reduction mechanism 20, and in formulating control commands for controlling actuation of the air drag reduction mechanism 20 as described herein. For example, the air drag reduction mechanism actuation sensors 29 may include sensors providing information usable for calculating or otherwise determining a drag coefficient or other drag characteristics of the vehicle under various operating conditions. Suitable sensors may be provided to estimate, detect, or aid in the determination of such parameters as the flow speed of the vehicle relative to the speed of an airstream in which it is traveling (i.e., the relative flow speed), the forces (such as drag forces) acting on portions of the vehicle due to airflow, the mass density of the air through which the vehicle is flowing, and other pertinent parameters. Information from these air drag reduction mechanism actuation sensors may be used to formulate commands for automatically actuating the air drag reduction mechanism.

As used herein, the term "actuation" may refer to rotation of the air deflector 24 from the stowed configuration to the deployed configuration, and rotation of the air deflector from the deployed configuration to the stowed configuration. The term "actuation" may also refer to extension of the air deflector second portion 24b to an extended configuration, and also withdrawal of the air deflector second portion into the air deflector first portion 24a, to the retracted configuration. The term "actuation" may also refer to controlling the amount by which the air deflector second portion 24b extends from the air deflector first portion 24a, with regard to potential obstructions in the path of extension of the air deflector second portion.

In one or more arrangements, one or more suitable vehicle relative flow speed sensors 29b may be provided at suitable locations on the vehicle 12 to estimate, detect, and/or aid in the determination of a flow speed of the vehicle relative to the airstream in which it is traveling. This parameter may greatly affect the air drag on the vehicle. In one or more arrangements, one or more air deflector airstream force sensors 29a may be provided at suitable locations on the vehicle 12 to estimate, detect, and/or aid in the determination of a drag force or other force exerted on the vehicle by a moving airstream. In one example, one or more air deflector airstream force sensors 29a may be located along the air deflector 24 in positions for measuring the force of an airstream (such as airstream FF of FIG. 1A) impinging on the air deflector 24 during motion of the vehicle 12. In another aspect, air deflector motion limiting sensors 27 may be provided for the purpose of limiting the motion of the air deflector second portion 24b with respect to first portion 24*a*, when the air deflector 24 is reconfigured from the retracted configuration to the extended configuration.

In one or more arrangements, motion limiting sensors 27 may include, for example, one or more air deflector proximity sensors 27*b*. Proximity sensor(s) 27*b* may be configured to detect a proximity of a forward edge 24*b-f* of the air deflector second portion 24*b* to an object positioned in a path of motion of the air deflector second portion 24*b* when the air deflector second portion is extending from the retracted configuration to the extended configuration. Proximity sensor(s) 27*b* may also (or alternatively) be configured to detect a distance between the forward edge 24*b-f* of the air deflector second portion 24*b* and such an object, when the air deflector second portion 24*b* is extending from the retracted configuration to the extended configuration of the air deflector 24. Such an object may be, for example, an item of cargo or other object positioned in the cargo bed in the path of forward motion of the air deflector second portion, in a location that may obstruct or interfere with the maximum forward extension of the air deflector second portion 24*b* from the air deflector first portion 24*a*. Proximity sensor(s) 27*b* may be located along the air deflector second portion forward edge 24*b-f* or in any other location which facilitates detection of the distance of the air deflector second portion 24*b* from a potential obstruction in the cargo bed, or a proximity of the air deflector second portion 24*b* from the potential obstruction. Proximity sensor(s) 27*b* may be operatively coupled to the computing system 14 to provide the computing system with proximity data. The computing system may process the proximity data to formulate commands directed to stopping further forward motion of the air deflector second portion if a potential obstruction is detected.

In one or more arrangements, motion limiting sensors 27 may include one or more air deflector extension force measurement sensors 27*a*. Air deflector extension force measurement sensors 27*a* may be configured to measure a magnitude of a reaction force due to contact between the air deflector second portion forward edge 24*b-f* and a element of cargo or other obstruction positioned in the cargo bed. In this scenario, the air deflector second portion forward edge 24*b-f* makes direct contact with the obstruction, and a contact force between the air deflector second portion 24*b* and the obstruction is measured or otherwise determined. This contact force may serve as an indication that the air deflector second portion 24*b* has contacted an obstruction to further forward motion.

Air deflector extension force sensors 27*a* may be operatively coupled to the computing system 14 to provide the computing system with force data. The computing system 14 may process the force data to formulate commands directed to stopping further forward motion of the air deflector second portion 24*b*, to prevent possible damage to the obstruction and/or the air drag reduction mechanism. This permits the air deflector second portion 24*b* to extend as far forward as possible into the cargo bed, to aid in closing any gaps between the air deflector 24 and any objects positioned in the cargo bed into which an airstream may flow, thereby increasing air drag.

Other sensors may be in operative communication with the computing system 14, and may provide information usable in formulating air drag reduction mechanism control commands. In addition, inputs from multiple sensors (or multiple types of sensors) may be processed in combination to formulate suitable air drag reduction mechanism control commands. A sensor fusion algorithm 138 may be an algorithm (or a computer program product storing an algorithm) configured to accept data from the sensor system 28 as an input. The data may include, for example, data representing information sensed at the sensors of the sensor system 28. The sensor fusion algorithm may process data received from the sensor system to generate an integrated or composite signal (formed, for example, from outputs of multiple individual sensors). The sensor fusion algorithm 138 may include, for instance, a Kalman filter, a Bayesian network, or other algorithm. The sensor fusion algorithm 138 may be stored on a memory (such as memory 54) incorporated into or in operative communication with computing system 14 of another computing system or device, may be executed by the associated computing system or device, in a manner known in the art.

If a sensor output signal or other signal requires preprocessing prior to use by the computing system or another vehicular system or element, a known or suitable processing means (for example, an analog-to-digital (A/D) converter or digital-to-analog (D/A) converter) may be incorporated in operative communication with the sensor system and the computing system. Similarly, if operation of any actuatable system or component will require processing of a control signal received from the computing system prior to use, a known or suitable processing means may be incorporated between the computing system and the actuatable system or component.

The use of "continuously" or "continuous" when referring to the reception, gathering, monitoring, processing, and/or determination of any information or parameters described herein means that the computing system 14 may be configured to receive and/or process any information relating to these parameters as soon as the information exists or is detected, or as soon as possible in accordance with sensor acquisition and processor processing cycles. As soon as the computing system 14 receives data from sensors or information relating to the drag or air resistance encountered by the vehicle, the computing system may act in accordance with stored programming instructions. Similarly, the computing system may receive and process an ongoing or continuous flow of information from sensor system 28 and from other information sources. This information may be processed and/or evaluated in accordance with instructions stored in a memory, in a manner and for the purposes described herein.

The computing system 14 may be operatively connected to the other vehicle systems and elements and otherwise configured so as to affect control and operation of the vehicle 12 and its components as described herein. The computing system 14 may be configured to control at least some systems and/or components autonomously (without user input) and/or semi-autonomously (with some degree of user input). The computing system may also be configured to control and/or execute certain functions autonomously and/or semi-autonomously. The computing system 14 may additionally or alternatively include components other than those shown and described. The computing system 14 may control the functioning of the vehicle 12 based on inputs and/or information received from sensors 28 and/or from any other suitable source of information.

FIG. 11 illustrates a block diagram of an exemplary computing system according to one or more illustrative embodiments of the disclosure. The computing system 14 may have some or all of the elements shown in FIG. 11. In addition, the computing system 14 may also include additional components as needed or desired for particular applications. The computing system 14 may also represent or be embodied in a plurality of controllers or computing devices that may process information and/or serve to control individual components or subsystems of the vehicle 12 in a distributed fashion.

The computing system 14 may include one or more processors 58 (which could include at least one microprocessor) for controlling overall operation of the computing system 14 and associated components, and which executes instructions stored in a non-transitory computer readable medium, such as the memory 54. "Processor" means any component or group of components that are configured to execute any of the processes and/or process steps described herein or any form of instructions to carry out such processes/process steps or cause such processes/process steps to be performed. The processor(s) 58 may be implemented with one or more general-purpose and/or one or more special-purpose processors. Examples of suitable processors include microprocessors, microcontrollers, DSP processors, and other circuitry that can execute software. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other. In one or more arrangements, the processor(s) 58 can be a main processor of the vehicle 12. For instance, the processor(s) 58 can be part of an electronic control unit (ECU).

In some embodiments, the computing system 14 may include RAM 50, ROM 52, and/or any other suitable form of computer-readable memory. The memory 54 may comprise one or more computer-readable memories. A computer-readable storage or memory 54 includes any medium that participates in providing data (e.g., instructions), which may be read by a computer. Such a medium may take many forms, including, but not limited to, non-volatile media, volatile media, etc. The memory or memories 54 can be a component of the computing system 14, or the memory or memories can be operatively connected to the computing system 14 for use thereby. The term "operatively connected," as used throughout this description, can include direct or indirect connections, including connections without direct physical contact.

The memory 54 may contain data 60 and/or instructions 56 (e.g., program logic) executable by the processor(s) 58 to execute various functions of the vehicle 12. The memory 54 may contain additional instructions as well, including instructions to transmit data to, receive data from, interact with, or control one or more of the vehicle systems and/or components described herein (for example, the air drag reduction mechanism 20). The computing system 14 may store and may be configured to implement an air drag reduction mechanism control capability 62. The an air drag reduction mechanism control capability 62 may be stored in memory 54 and/or in other memories and implemented in the form of computer-readable program code that, when executed by a processor, implement control of the air drag reduction mechanism as described herein. In addition to computing system 14, the vehicle may incorporate additional computing systems and/or devices (not shown) to augment or support the control functions performed by computing system 14, or for other purposes.

The computing system 14 may also store and may be configured to implement one or more relationships usable for determining the drag coefficient of a particular vehicle configuration. The relationship(s) may be adapted to use vehicle sensor data as inputs, and may be tailored for a specific vehicle geometry or configuration. The computing system may be configured to estimate or determine the vehicle drag coefficient in real time, and on a continuous basis, using stored information or relationship(s) and sensor data. The relationship(s) may be stored in the form of lookup tables, formulae, or in any other suitable form. The drag coefficient for a particular vehicle configuration may be determined analytically and/or experimentally using known methods.

The drag coefficient information may be used in formulating air drag reduction system actuation commands. For example, the computing system 14 may be configured to use real-time drag coefficient estimates to dynamically control the extension of the air deflector second portion 24*b* from the air deflector first portion 24*a* so as to aid in minimizing the drag coefficient.

The vehicle 12 may be configured so that the computing system 14, sensor system 28, air drag reduction mechanism 20, and other systems and elements thereof can communicate with each other using a controller area network (CAN) bus 33 or the like. Via the CAN bus and/or other wired or wireless mechanisms, the computing system 14 may transmit messages to (and/or receive messages from) the various vehicle systems and components. Alternatively, any of the elements and/or systems described herein may be directly connected to each other without the use of a bus. Also, connections between the elements and/or systems described herein may be through another physical medium (such as wired connections) or the connections may be wireless connections.

Automatic Operation of the air drag reduction mechanism 20 to reconfigure the air deflector 24 will now be discussed with reference to the FIGS. 1A-8.

Figure 3:
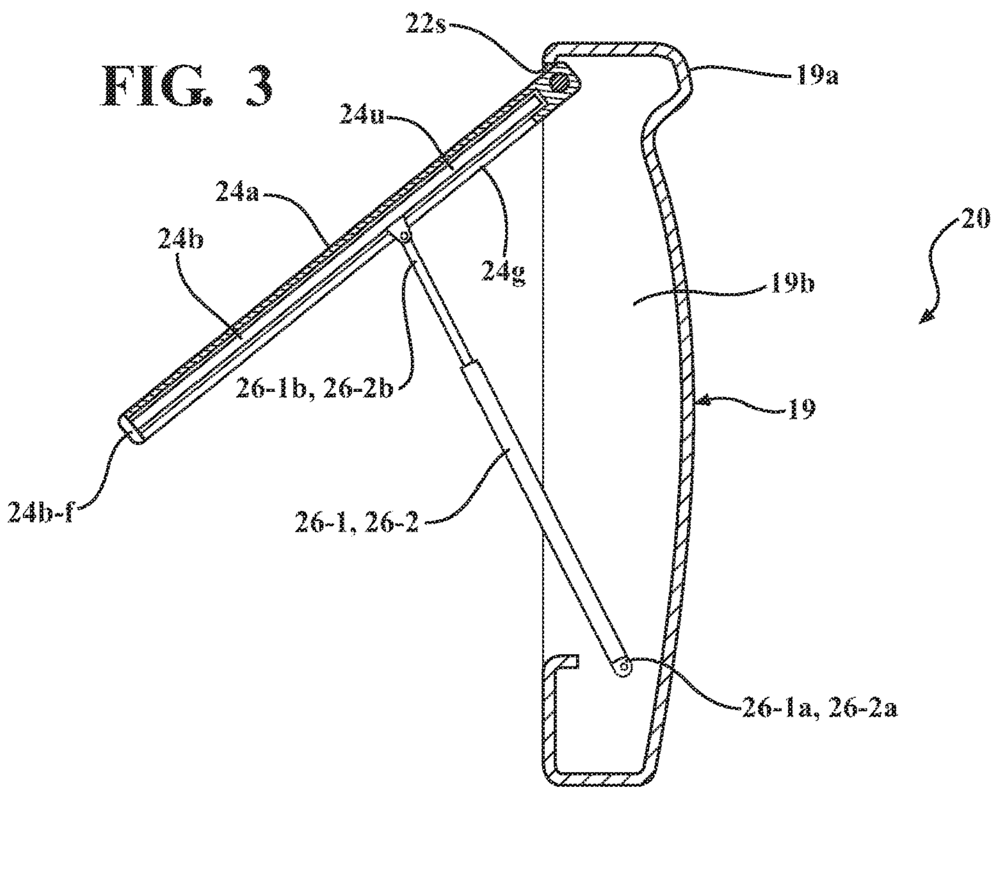
FIG. 3 is the schematic cross-sectional side view of FIG. 2, showing the air deflector shown in a partially-deployed configuration.

Referring to FIGS. 1A, 2, and 6, the air deflector 24 of the air drag reduction mechanism 20 may normally be in the stowed condition. Referring to FIG. 3, when a deployment command is generated by computing system 14, actuators 26-1 and 26-2 are operated to deploy the air deflector 24 to the degree specified by the deployment command. The air deflector first portion 24*a* may be raised by actuators 26-1 and 26-2 to a deployed configuration extending parallel with a floor of the cargo bed as shown in FIGS. 1B, 4, and 7. The locations of the connections between actuators 26-1 and 26-2 and the air deflector second portion 24*b* may be specified with respect to the rotational axis of the air deflector first portion 24*a*, so as to aid in focusing the lifting forces applied by the actuators to help maintain the air deflector second portion 24*b* within the air deflector first portion 24*a* until the air deflector first portion 24*a* is parallel or substantially parallel with the floor of the cargo bed.

When the air deflector first portion 24*a* reaches an orientation substantially parallel with the floor of the cargo bed, further rotation of the air deflector first portion 24*a* may be prevented by a hard shoulder 22*s* formed in the base 19*a* along an edge of cavity 19*b*. When the air deflector first portion 24*a* is in the fully deployed configuration shown in FIGS. 1B, 4, and 7, the air deflector 24 may also be configured from the retracted configuration to the extended configuration shown in FIGS. 1B, 5, and 8.

When further upward rotation of the air deflector first portion 24*a* is stopped, the forces exerted by the actuators 26-1 and 26-2 act on the air deflector second portion 24*b*, to extend the air deflector second portion 24*b* from the air deflector first portion 24*a*, as shown in FIGS. 1B, 5 and 8. When the air deflector second portion 24*b* extends a sufficient distance out of air deflector first portion 24*a*, latching mechanisms 30-1 and 30-2 engage to lock air deflector first portion 24*a* in the fully deployed configuration shown in 1B, 4, and 7 and as previously described. This enables the actuators 26-1 and 26-2 to move air deflector second portion 24*b* in and out of the air deflector first portion 24*a* as needed without shifting the angular orientation of the air deflector first portion 24*a*.

When it is desired to stow the air deflector 24, the actuators 26-1 and 26-2 may be operated to pull the air deflector second portion 24*b* back into the air deflector first portion 24*a*. When the air deflector second portion 24*b* is drawn a sufficient amount into the air deflector first portion 24*a*, the latch actuator 81 engages the actuator engagement portion(s) 30*f*, causing the latching mechanisms 30-1 and 30-2 to disengage as previously described, thereby releasing the air deflector first portion 24*a* to rotate with respect to the base 19*a*. Further contraction of the actuators 26-1 and 26-2 may force the air deflector first portion 24*a* downward, until it reaches the stowed configuration.

It may be seen that the deployable mounting of the air deflector second portion 24*b* within the air deflector first portion 24*a* enables a greater portion of the cargo bed to be covered, thereby enabling a reduction in vehicle air drag for a variety of air flow conditions and cargo bed lengths.

Referring to FIGS. 10 and 11, one embodiment of an actuation mode of the air drag reduction mechanism will now be described. The actuation mode described in FIGS. 10 and 11 will be described in terms of the use of the value of a single criterion for actuation of the air deflection mechanism. The criterion used may be a single or individual criterion, or it may be a composite criterion, formed by acquiring sensor data relating to multiple individual air drag reduction mechanism actuation criteria and processing the data to generate a composite value for use in formulating actuation commands.

In one or more arrangements, the computing system 14 may include one or more processors 59 for controlling operation of the computing system 14, and a memory 54 for storing data 60 and program instructions 56 usable by the one or more processors 58, as previously described. Referring to FIG. 10, the one or more processors 58 may be configured to execute instructions stored in the memory to, in block 1005, determine a value of an air drag reduction mechanism actuation criterion. As previously described, the one or more air drag reduction mechanism actuation criteria may include the relative flow speed. Alternatively (or in addition to) the relative flow speed, the one or more air drag reduction mechanism actuation criteria may include a force (such as force F1 of FIG. 1A) exerted by an airstream on a surface of a tailgate facing toward a vehicle cargo bed. Alternatively (or in addition to) the relative flow speed and/or a force exerted by an airstream on the tailgate, the one or more air drag reduction mechanism actuation criteria may include an estimated value of a drag coefficient of the vehicle. Values for the actuation criterion may be determined using sensors data and/or stored information, such as lookup tables, formulae, etc., as previously described. Values for the criterion may be determined continuously, based on an ongoing stream of sensor data, so that the criterion value is constantly updated.

In block 1010, the computing system may determine whether the value of the air drag reduction mechanism actuation criterion is within a predetermined range. The range for the criterion may be pre-programmed, or the actuation range may be input by a user. The actuation range for the criterion may be stored in a memory.

Next, responsive to the determination of whether the value of the air drag reduction mechanism actuation criterion is within the predetermined range, operation of the tailgate-mounted air drag reduction mechanism 20 may be controlled so that an air deflector of the air drag reduction mechanism is configured to one of a deployed configuration and a stowed configuration. For example, if the air drag reduction mechanism actuation criterion value is within the predetermined range, the air deflector may be configured to one of the deployed configuration and the stowed configuration. If the air drag reduction mechanism actuation criterion value is not within the predetermined range, the air deflector may be configured to the other one of the deployed configuration and the stowed configuration. In the particular embodiment shown in FIG. 10, it is generally desired to configure the air deflector is in the deployed configuration if the value of the air drag reduction mechanism actuation criterion is within the predetermined range, and to configure the air deflector is in the stowed configuration if the value of the air drag reduction mechanism actuation criterion is outside the predetermined range.

Following block 1010, if it is determined that the air drag reduction mechanism actuation criterion value is within the predetermined range, the computing system may, in block 1020, determine if the air deflector is in the deployed configuration.

Responsive to a determination that the air deflector is not in the deployed configuration, the computing system may, in block 1080, determine if the value of the actuation criterion has been within the predetermined range for longer than a first predetermined time period. The time period is provided to prevent deployment of the air deflector in cases where, for example, the vehicle speed and/or the wind force exerted on the tailgate reach levels that would normally prompt deployment of the air deflector, but only for a short length of time (for example, in short spurts of fast, stop-and-go driving). The predetermined time period may be set by a user or pre-programmed.

Responsive to a determination that the value of the actuation criterion has been within the predetermined range for longer than the first predetermined time period, the computing system may, in block 1090, configure the air deflector to the deployed configuration. That is, if the value of the actuation criterion has been within the predetermined range for longer than the first predetermined time period, it is determined that the air deflector should be deployed to help reduce drag.

Referring back to block 1010, following block 1010, if it is determined that the air drag reduction mechanism actuation criterion value is not within the predetermined range, the computing system may, in block 1030, determine if the air deflector is in the deployed configuration. If it is determined that the air deflector is in the deployed configuration, the computing system may, in block 1060, determine if the value of the actuation criterion has been outside the predetermined range for longer than a second predetermined time period. If it is determined that the value of the second actuation criterion has been outside the predetermined range for longer than the second predetermined time period, the computing system may, in block 1070, configure the air deflector to the stowed configuration. If it is determined in block 1030 that the air deflector is not in the deployed configuration, the computing system may, in block 1050, leave the air deflector in the stowed condition.

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The flow diagrams and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Also disclosed herein are non-transitory computer readable media with stored instructions. The instructions could be executable by a computing system or device to cause the computing system or device to perform functions similar to those described in the methods described below.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of any embodiments described herein.

What is claimed is:

1. An air drag reduction mechanism for a vehicle, the mechanism comprising:

a base;

an air deflector rotatably coupled to the base, the air deflector being configurable to a stowed configuration and a deployed configuration, the air deflector also being configurable to a retracted configuration and an extended configuration;

at least one actuator operatively coupled to the air deflector, the at least one actuator being structured to rotate the air deflector between the stowed configuration and the deployed configuration; and at least one latching mechanism operatively coupled to the air deflector and the base, the at least one latching mechanism being separate from the at least one actuator and structured to engage when the air deflector rotates from the stowed configuration to the deployed configuration, to maintain the air deflector in the deployed configuration, the at least one latching mechanism also being structured to disengage when the air deflector reconfigures from the extended configuration to the retracted configuration so as to permit rotation of the air deflector from the deployed configuration to the stowed configuration, the at least one latching mechanism including:

a latching member extending from the air deflector;

a spring-loaded engagement member operatively coupled to the air deflector and structured to engage the latching member when the air deflector is in the deployed configuration, to maintain the air deflector in the deployed configuration; and a latch actuator rotatably coupled to the air deflector and structured to engage the engagement member during reconfiguration of the air deflector from the extended configuration to the retracted configuration, to disengage the engagement member from the latching member and enable rotation of the air deflector from the stowed configuration to the deployed configuration.

2. An air drag reduction mechanism for a vehicle, the mechanism comprising:

A base;

an air deflector rotatably coupled to the base, the air deflector being configurable to a stowed configuration and a deployed configuration, the air deflector also being configurable to a retracted configuration and an extended configuration, the air deflector having a first portion rotatably coupled to the base, and a second portion received within the first portion so as to be retractably extendable from the first portion, the air deflector being structured to be configurable to the extended configuration by extending the air deflector second portion from the air deflector first portion, and structured to be configurable to the retracted configuration by retracting the air deflector second portion into the air deflector first portion;

at least one actuator operatively coupled to the air deflector, the at least one actuator being structured to rotate the air deflector between the stowed configuration and the deployed configuration, the at least one actuator being operatively coupled to the air deflector second portion so as to enable the at least one actuator to extend the air deflector second portion from the air deflector first portion, and so as to enable the at least one actuator to retract the air deflector second portion into the air deflector first portion;

at least one latching mechanism operatively coupled to the air deflector and the base, the at least one latching mechanism being separate from the at least one actuator and structured to engage when the air deflector rotates from the stowed configuration to the deployed configuration, to maintain the air deflector in the deployed configuration, the at least one latching mechanism also being structured to disengage when the air deflector reconfigures from the extended configuration to the retracted configuration so as to permit rotation of the air deflector from the deployed configuration to the stowed configuration;

a sensor configured to detect a distance between a forward edge of the air deflector second portion and an object positioned in a path of motion of the air deflector second portion when the air deflector second portion is extending from the retracted configuration to the extended configuration, wherein the air drag reduction mechanism is configured to be operable to, responsive to detection of the distance between the air deflector second portion and the object positioned in a path of motion of the air deflector second portion, control the air deflector second portion to prevent further motion of the air deflector second portion toward the object.

3. The air drag reduction mechanism of claim 2 wherein the air deflector second portion is structured to disengage the at least one latching mechanism during retraction of the air deflector second portion into the air deflector first portion.

4. The air drag reduction mechanism of claim 2 further comprising a force measurement sensor configured to detect a magnitude of a force resisting movement of the air deflector second portion from the retracted configuration to the extended configuration.

5. The air drag reduction mechanism of claim 2 wherein the at least one actuator comprises at least one actuatable cylinder.

6. The air drag reduction mechanism of claim 5 wherein the at least one actuatable cylinder is rotatably connected to both the base and the air deflector.

7. The air drag reduction mechanism of claim 2 wherein the base is formed as a part separate from any portion of a tailgate of the vehicle and is structured to be attachable to the tailgate.

8. The air drag reduction mechanism of claim 2 wherein the base is formed by a portion of a tailgate of the vehicle.

9. The air drag reduction mechanism of claim 2 wherein the air deflector first portion is structured to extend parallel with a floor of a cargo bed of the vehicle when the air deflector is in the extended configuration.

10. The air drag reduction mechanism of claim 1 wherein the at least one latching mechanism includes a latching member extending from the air deflector, a latch actuator rotatably coupled to the air deflector, and a spring-loaded engagement member, wherein the at least one latching mechanism is structured such that engagement between the latching member and the engagement member during a reconfiguration of the air deflector from the stowed configuration to the deployed configuration urges the engagement member in a first direction until the air deflector is in a fully deployed configuration, wherein the at least one latching mechanism is structured such that the engagement member automatically moves in a second direction opposite the first direction after the air deflector reaches the fully deployed configuration, wherein the at least one latching mechanism is structured such that movement of the engagement member in the second direction after the air deflector reaches the fully deployed configuration moves a portion of the engagement member under the latching member to a supporting position where the engagement member supports the latching member and supports the air deflector attached to the latching member in the fully deployed configuration, wherein the latch actuator is structured to extend from the air deflector so as to contact the engagement member so as to move the engagement member in the first direction during a reconfiguration of the air deflector from the extended configuration to the retracted configuration, and wherein the at least one latching mechanism is structured such that movement of the engagement member in the first direction by the latch actuator operates to remove the portion of the engagement member from the supporting position, thereby releasing the air deflector to rotate to the stowed configuration.

* * * * *